Nov. 25, 1969  G. CROMPTON  3,479,967
ELECTRIC LOCOMOTIVE
Filed Aug. 25, 1967  3 Sheets-Sheet 1
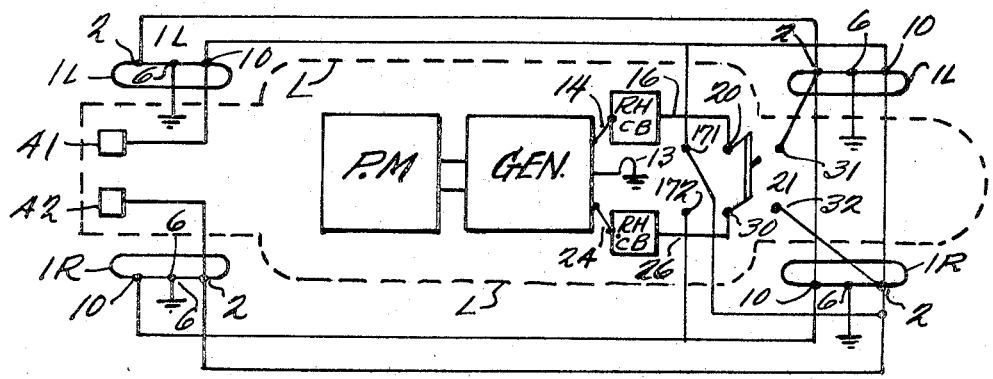
Fig. 1.
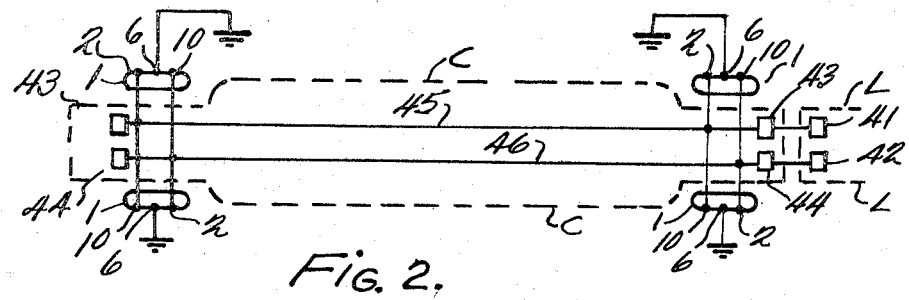
Fig. 2.
Fig. 3
Fig. 4
INVENTOR.
George Crompton Nov. 25, 1969   G. CROMPTON   3,479,967
ELECTRIC LOCOMOTIVE Filed Aug. 25, 1967   3 Sheets-Sheet 3

INVENTOR.
George Crompton

United States Patent Office 3,479,967
Patented Nov. 25, 1969

3,479,967
ELECTRIC LOCOMOTIVE
George Crompton, 710 Armada Road S.,
Venice, Fla. 33595
Continuation-in-part of application Ser. No. 501,949,
Oct. 22, 1965. This application Aug. 25, 1967, Ser.
No. 663,386
Int. Cl. B61c *3/00, 9/45;* B61f *13/00*
U.S. Cl. 105—53
14 Claims

ABSTRACT OF THE DISCLOSURE

The driving wheels of the locomotive that fit the railroad track are the rotors of electric motors the stators of which are suspended outside of said driving wheels and which stators create rotating magnetic fields due to connection to polyphase electric power from a diesel driven generator or from outside power, the rotating magnetic fields producing electric current in the said driving wheels and the reaction of the rotating magnetic field with the resultant electric field in the said wheels producing a train driving torque in the said wheels and by simply reversing a switch in the locomotive the engineer can apply electromagnetic brakes to the wheels, the synchronous speed of the locomotive being, in the example, 225 m.p.h. with a projected actual speed of up to 200 m.p.h.

---

The invention relates to electric locomotives, and this application is a continuation in part of my co-pending application Ser. No. 501,949, filed Oct. 22, 1965, now abandoned which was a continuation in part of my co-pending application Ser. No. 464,599, filed June 11, 1965, now abandoned entitled "Railroad Trains."

One object of the invention is to provide a railroad (railway) train which will go 200 (statute) miles per hour on present tracks. Another object is to provide a superior electric driving motor for the wheels of locomotives and cars. Another object is to achieve a direct electric drive, requiring no gears, to the wheel of a vehicle.

Another object is to provide locomotives and cars with eleceromagnetic brakes. Another object is to simplify the driving system for locomotives and all kinds of cars. Another object is to use locomotive and car wheels as the rotors (armatures) of electric motors, the field pieces of which generate rotating magnetic fields. Another object is to provide a superior field construction for induction motors.

Another object is to provide a variable counter torque to slow down and to stop a high speed train, which is not a friction brake but an electro-magnetic brake, whereby the negative acceleration will be uniform (at any given setting) but can be adjusted, whereby to provide smooth operation of the train. Another object is to provide a smooth positive acceleration of a train.

Other objects will be apparent or pointed out hereinafter.

In the accompanying drawings illustrating one of many possible embodiments of the invention:

FIGURE 1 is a mechanical electrical diagram of the locomotive,

FIGURE 2 is a mechanical electrical diagram of a railroad car,

Figure 5:
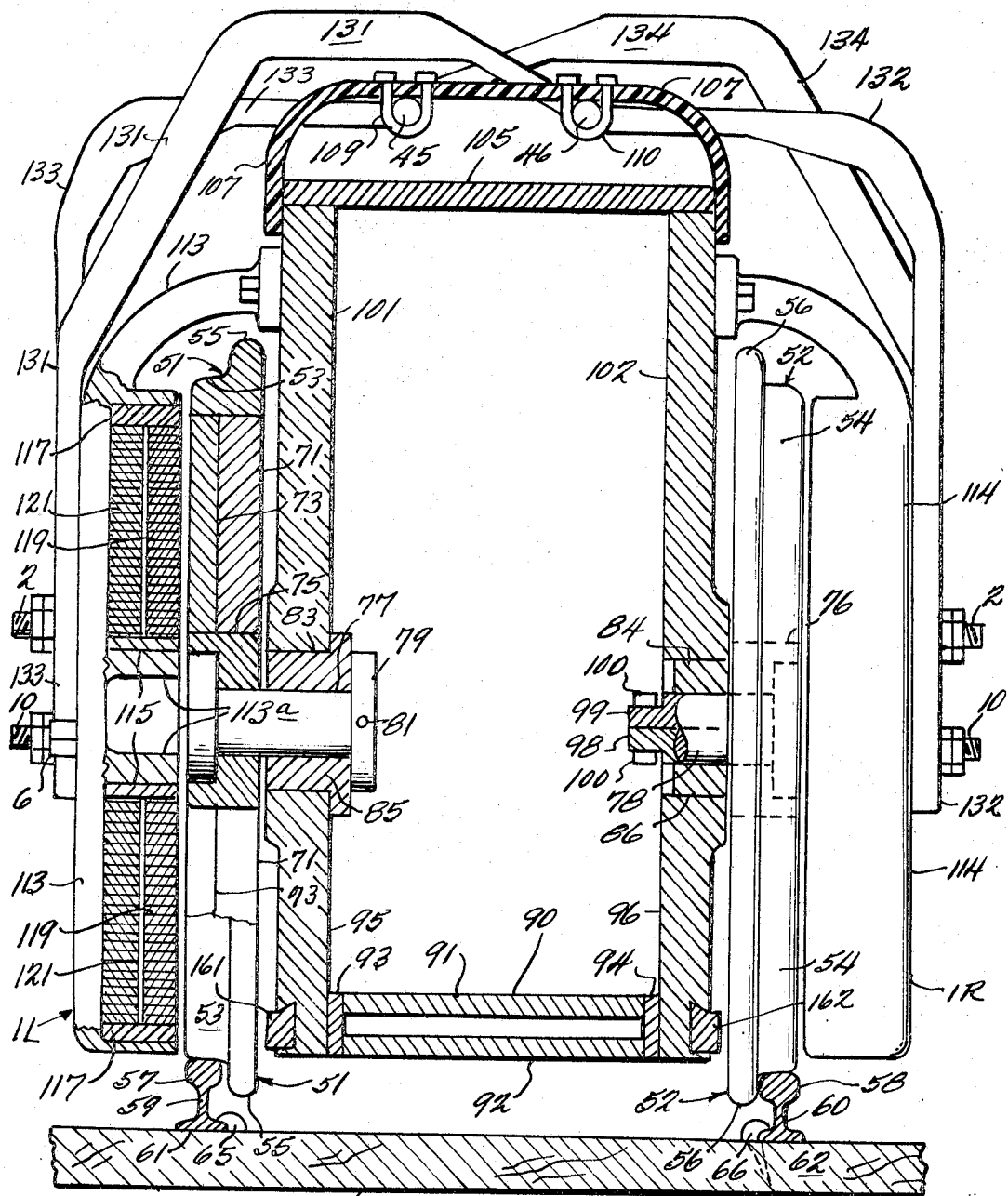
Figure 6:
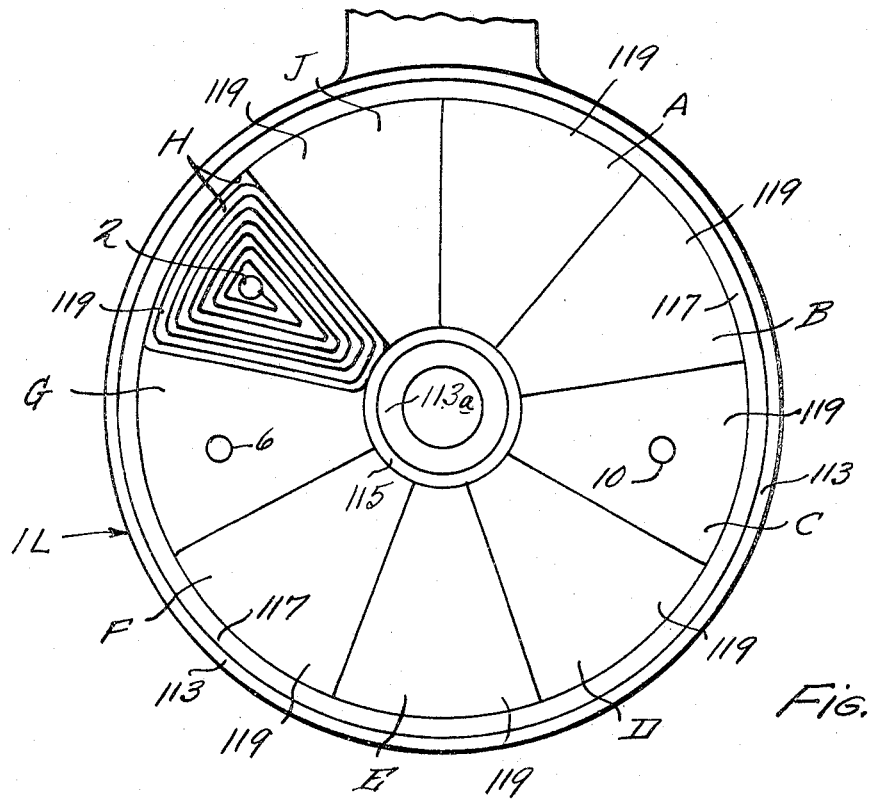
Figure 7:
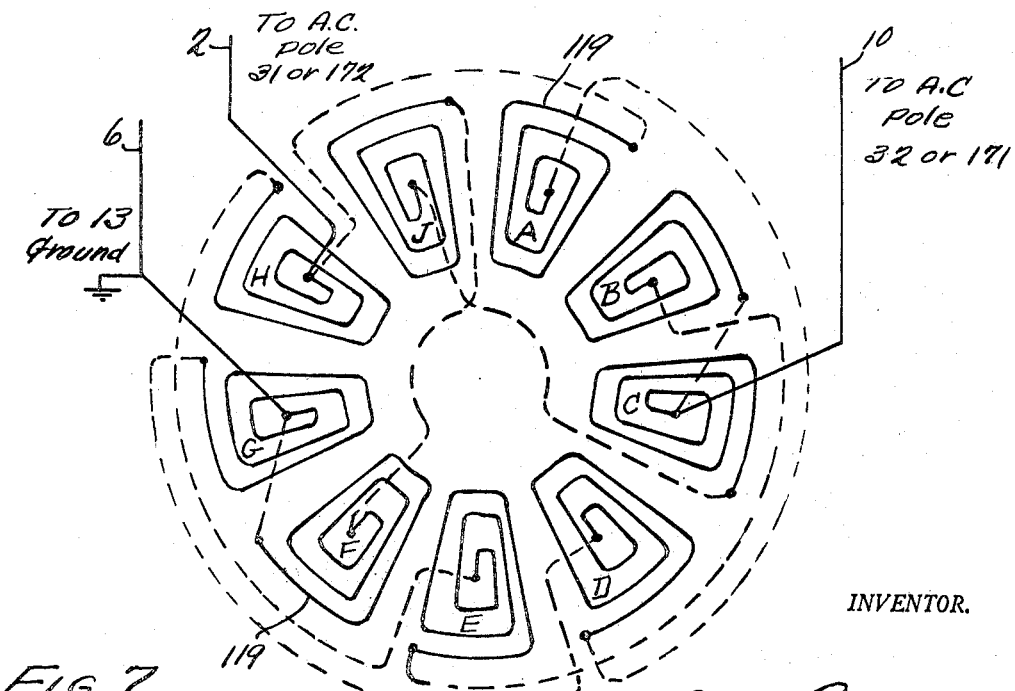

FIGURE 3 is a side elevation of a locomotive and/or railroad car wheel, having an armature of a motor embodied in it, being a right hand wheel of the locomotive, FIGURE 4 is an outside elevation of a left hand locomotive stator having the field pieces (poles) to create a revolving magnetic field to drive a wheel like that of FIGURE 3, showing the bus bars which carry the electric current for excitation of the field pieces (poles), FIGURE 5 is a vertical cross section through a locomotive according to the invention, which is representative also of a car having driving wheels according to the invention, some parts being in elevation, FIGURE 6 is an inside elevation of the field pieces (poles) and their cylindrical casings, FIGURE 7 is the wiring diagram, in which the windings 119 making the poles A–J are in full lines, the connections from the generator and ground to the terminals 2, 6 and 10 are in full lines and the connections between the windings 119, A–J are in dash lines.

Referring first to FIGURE 1 which is a diagrammatic plan view, the suggested outline of the locomotive L is shown in dash lines. I provide a prime mover P.M. In railroads that are electrified, this can be an electric motor of the type which they are now using. Examples are the Pennsylvania Railroad between New York and Washington, the New Haven Railroad between New York and New Haven, Conn., and parts of the Illinois Central. The prime mover drives a generator marked Gen. in FIGURE 1.

The generator Gen. is a polyphase generator which produces a rotating magnetic field by suitable poles made of coils of the field of a motor connected to it. These poles constitute field pieces 1. I have based my calculations on a 3 phase generator and motor as these are the only kinds now in extensive use so far as I know; I mean among multi-phase generators and motors.

The generator terminals are set 120° apart, electrically. They transmit electric current to field pieces 1L and 1R; the L indicating left, the R indicating right. Referring now to FIGURE 4, each field piece (1L shown) has three terminals—2, 6, and 10. 2 stands for two o'clock, 6 stands for six o'clock, and 10 stands for ten o'clock. Two o'clock is 120° from six o'clock, six o'clock is 120° from ten o'clock, and ten o'clock is 120° from two o'clock. Six o'clock, 6, is the ground terminal. Geometrically 2, 6 and 10 are arranged as shown in FIGURE 4 for stator 1L and the same but mirrored for stator 1R.

As shown in FIGURE 1, a terminal of the generator is connected by a line 13 to ground, as indicated by the ground symbol, this meaning the framework of the locomotive. The terminals 6 of the field pieces are also connected to ground. One terminal of the generator is connected by a line 14 to a box marked RH CB. This is diagrammatic of a rheostat and a circuit breaker which are in series. A line 16 connects the box RH CB to a central pole 20 of a double pole double throw switch 21.

A line 24 from the generator goes to another box RH CB, which is another rheostat and circuit breaker in series, and from that a line 26 goes to a central pole 30 of the double pole double throw switch 21.

The poles 20 and 30 can be connected to poles 31 and 32, in which case the terminal 2 of 1L and the terminal 10 of 1R are energized at one phase and the terminal 2 of 1R and 10 of 1L are energized at another phase, the terminals 6 being grounded and representing the third phase. From FIGURE 1 it will be seen that this is the case both with the forward field pieces to the right of FIGURE 1, and the rear field pieces to the left of FIGURE 1. The conductor lines which represent cables and bus bars are so clear that I haven't numbered them. Remember the convention that crossing lines are not connected unless there is a distinct dot where they cross.

In FIGURE 2 the terminals 2, 6 and 10 are clearly identified, both right and left and front and rear. The train is considered to be going to the right in FIGURES 1 and 2. The suggested outline of the car C is shown in dash lines. The field pieces 1 are shown but no L and R are given because they become reversed when the car goes the other way.

The locomotive has electrical cable couplers 41 and 42 and the car C has electrical cable couplers 43 and 44. When the train is made up these are connected as shown in FIGURE 2, 41 to 43, and 42 to 44. I also show couplers 43 and 44 at the rear end of the car C. Couplers 43 and 43 are connected by a long cable 45 overhead in the car. Couplers 44 and 44 are connected by a long cable 46 overhead in the car. Locomotive and cars are grounded together.

Referring now to FIGURE 5, the locomotive has a pair of driving wheels 51 and 52. Preferably, according to my invention, each locomotive or car has only four wheels, and again preferably, according to my invention, each wheel is a driver.

The wheels 51 and 52 have treads 53 and 54 and flanges 55 and 56. The treads 53 and 54 are shown as resting on railheads 57 and 58 supported by webs 59 and 60 supported by flanges 61 and 62 held to ties or sleepers 63 by spikes 65 and 66. Rails 57, 59, 61 and 58, 60, 62 are standard American rails, and although they differ, I will say for a first-class railroad. So are the ties or sleepers 63 standard and they are made of wood and a tie 63 is shown in section. The rails are shown in section. I show a clearance between the flange 55 and the railhead 57 to provide for the cant going around sharp curves.

It will be seen that the axles for the wheels 51 and 52 are not the same, that is to say these wheels have two axles whereas in regular railway construction each pair of wheels right and left has one axle rigidly connecting the two, which is why the wheels squeak when the train goes around any sharp curve. That is, when a pair of wheels are rigidly connected to a single axle, the wheels have to rotate at the same r.p.m., whereas the outside rail is longer than the inside rail.

I contemplate that my wheels 51 and 52 will be six feet, 72 inches, in diameter at the treads. This makes them about 79 inches in diameter at the flanges. This is not unusual; it was frequent practice in steam locomotives before they were discarded in favor of diesels. The Atlantic type was built for the Atlantic Coast Line in 1895 and used later on by the Chicago and Northwestern Railway and had drivers that were 74 inches diameter at the treads and 81 inches diameter at the flanges. The Erie Railroad had Atlantics before 1905, the drivers stated to be 76 inches in diameter, whether treads or flanges not stated. The first Atlantics used on the New York Central system had drivers 72 inches in diameter at the treads and 79 inches in diameter at the flanges. Other examples could be given but these seem to be enough. See American Locomotives by Edwin P. Alexander, Bonanza Books, New York, Copyright 1950.

These wheels 51 and 52 are spaced apart so that the insides of the railheads 57 and 58 can be four feet, eight and a half inches, apart, which is standard American gauge from Maine to Oregon, California to Florida.

The wheels 51 and 52 have spokes 71. These are covered on the outside by electroconductive plates 73 and 74. FIGURE 5 shows the left hand wheel 51 in section at the top, and in elevation at the bottom, the tread 52 and the flange 55 being broken away to show the spokes 71 and the plates 73 in elevation.

I contemplate that the treads 53, 54, the flanges 55, 56, and the spokes 71 will be made of the same steels which the locomotive builders used to build the driving wheels of the locomotives herein mentioned. They weren't always the same, but they were generally similar steels. So also the hubs 75 and 76 should be made of the same steels as were used. The hubs 75 and 76 have axles 77 and 78 which are headed as shown and integral with as by shrink fitting into the hubs 75 and 76. The axles have collars 79, and one not shown on the right which is similar, held in place by taper pins 81 on the left and one not shown on the right which is the same. The axles 77 and 78 fit in journal bearings 83 and 84, 85 and 86, each being a half bearing to permit assembly. Some play is allowed between each wheel and the bearings and the side of the car as indicated.

FIGURE 3 shows plates 74 which cover the spokes 71 behind them. The plates 73 and 74 should be made of highly conductive metal, and I select copper. I prefer beryllium bronze, 99 Cu 1 Be, because this is stronger than commercially pure copper yet it has nearly as much conductance. I do not recommend welding the copper plates to the spokes because of the difference in coefficient of expansion between copper and steel. These wheels and all their parts should be able to stand a temperature variation between say 40° below zero Centigrade, which may be encountered in the Rocky Mountains in wintertime, up to 100° C. which is hotter than nature but the plates 73 and 74 will heat up due to the energy that they absorb. However, they are very well air-cooled, especially at two hundred miles per hour. Illustratively, the plates 73 and 74 can be secured to the spokes 71 by drilling through the plates into the spokes, tapping the spokes, counterboring the plates, and inserting screws with heads fitting in the counterbores. This I have not illustrated as it is a common means for securing parts together and the screws may be assumed to be not in the section shown in FIGURE 5.

I contemplate that the locomotive and cars will be made of aluminum and/or magnesium, with perhaps some parts made out of steel and tops made out of fiberglass. The bearings 83 and 84, 85 and 86 can be made out of a good bearing bronze. I will now give an illustrative embodiment of the locomotive and car construction.

A long keel 90, extending the length of the locomotive or car, constitutes the floor and can be made of two parallel floor plates 91 and 92 joined together by end plates 93 and 94. The plates 93 and 94 can be welded to the plates 91 and 92. This keel 90 can be made of steel for strength.

The plates 93 and 94 are welded or otherwise secured to lower side pieces 95 and 96 made of aluminum. These have flanges at the top, shown only in the case of the flange 98 which is bolted by bolt and nut combinations 100 to upper aluminum side piece 102 opposite similar aluminum side piece 101 which has a flange like the flange 99, but it isn't shown. In other words in FIGURE 5 at the right hand side I show the wheel 52 in elevation whereas the wheel 51 is shown on the left hand side in section and broken away.

On the left hand side I show the axle 77, the collar 79 and the pin 81, but on the right hand side these parts are broken away to show the flanges 98 and 99, and the bolt and nut combinations 100, but the construction is altogether the same on both sides although oriented differently.

The tops of the side pieces 101 and 102 are connected by a flat plate 105 made of aluminum; this can be welded onto the plates or fastened to them by bolts. This is the ceiling of the locomotive or car. Above this is a roof 107 shown as being of inverted U shape, and this is desirably made of fiberglass because I don't want it to be electrically conductive. It can be attached to the side pieces 101 and 102 by bolts, not shown. The cables 45 and 46 are desirably made of copper and insulated by windings or by a coating of aluminum oxide as hereinafter descussed. They are upheld by U-shape hangers 109 and 110 having flanges like a capital U, which flanges hold them in place. The hangers extend through slots in the roof 107 and to put them in place the slots are wider out of the section; in other words, this is a bayonet construction. The hangers can be made of methyl methacrylate, and this is bendable and insulating.

To complete the description of an illustrative embodiment of the locomotive and car construction, it can be, from end to end, the same as shown in FIGURE 5, but I much prefer that it shall be wider in the central section inside of the wheels, but do not need to illustrate this since any practical car construction can be used. The limit of width is the same as that of the cars now in use on American railroads; that is to make them wider would create hazards in railroad yards where the curves are sharp.

Still referring to FIGURE 5, massive brackets 113 and 114, best made of steel for strength and permeability, are bolted to the side plates 101 and 102 and each one supports an annular casing made up of an inside steel cylinder 115 and an outside steel cylinder 117. They support field pole 119 windings made of (best mode) soft iron ribbon.

The casing 115–117 also supports a yoke 121 of soft iron ribbon. The turns of the windings 119 need insulation from each other and from the yoke 121 and from the casing 115–117. The best material and method of application known to me is aluminum oxide, $Al_2O_3$ applied as described in Norton Company's U.S. Patent No. 2,707,691, W. M. Wheildon, Jr., Trademark Rokide. Norton Company, Worcester, Mass., produces the aluminum oxide rods which are fed through a gun with a flame which melts the oxide (M.P. 2015° C.) and sprays it onto any article desired. I wrote the patent. This coating is refractory and electrically nonconductive and the ribbon can be bent after spraying.

The yoke 121 may be constructionally a soft iron ribbon wound round and round and round a mandrel of the same diameter as the cylinder 115 until the wound ribbon will just fit into the cylinder 117. The turns should be spot welded in many places to each other to form a rigid annular disc.

Referring now to FIGURE 6, the windings 119 make up individual pole pieces, nine in number, in the best mode of the invention, marked A, B, C, D, E, F, G, H, and J. Each pole piece is a sector of an annulus and it is not necessary to draw each of A–J. FIGURE 6 is an elevation looking outwardly from the wheel 51.

In order further to elucidate the construction of the fields, it seems best to describe how they are put together and I shall take the one supported by the bracket 113, FIGURE 5. The bracket 113 is in the locomotive shop. The yoke 121 is made and then drilled at 2, 6 and 10 midway between 115 and 117 to make room for bronze bolts to connect to the 3 phase power.

The nine pole pieces A, B, C, D, E, F, G, H and J are then made and space is left in the centre of each for the bronze bolts 2, 6 and 10. Also the "Rokide" is left off the outside and inside ends of the iron or copper ribbons which can be readily done by masking. "Rokide" flame doesn't burn good grade masking tape.

The exact length of ribbon to make each pole will be discovered by trial winding. Enough length is provided for each pole to extend from the outside thereof to the inside of the proper pole for the electrical connections, as the poles A–J are to be connected in series. Now the yoke 121 is inserted in the bracket 113 between 115 and 117. The ribbon ends are drawn across the far faces, FIGURE 6, of the pole pieces, so they are not visible in FIGURE 6. Thereby they are buried; otherwise they might be caught by the 200 mile an hour wind and the entire windings destroyed. Then the poles A–J are inserted, matching the holes. Then the "unrokided" ends of the ribbons are welded together. The bolts 2 and 10 are now inserted and welded to the ends of the ribbons in the holes. The ribbon ends are turned (bent) 90° edgewise to go flatwise from the periphery of one pole to the center of a connected pole. The "Rokide" coating will stand it.

The bolts 2 and 10 are "Rokided" where they pass through the bracket 113, and the yoke 121. They are headless and have shoulders to engage the inside of the bracket 113. They are screw driver slotted too. The bolts 6 are "Rokided" in the yoke 121, threaded in the bracket 113 and have heads.

The bracket 113 is now placed so that the geometrical faces of the poles A–J are horizontal (it might have been this way in the beginning). The casing 117 has been countersunk in many spots opposite A–J and the casing 115 desirably also. There is a small clearance here and there between the poles A–J and the cylinders 115–117.

Molten magnetic metal is now poured into the crevices all around. This or some other method of holding the pole pieces in place is necessary. Plates extending from the bracket 113 could be used.

Now the bracket 113 is bolted to the side piece 101 as shown in FIGURE 5. I provide large bus bars 131, 132, 133 and 134—see FIGURES 4 and 5. At this point the right and left geometry had better be studied. The locomotive and train were stated to be going to the right, FIGURES 1 and 2. In FIGURE 5 the field pieces or stators 1L and 1R are clearly marked, so the sectional view of the wheel and the field piece on the left of FIGURE 5 is on the left hand side of the locomotive.

In FIGURE 5 the reader is looking forward because left is left and right is right. The geometrical positions of the bolts 2, 6 and 10 are shown on FIGURES 4, 5 and 6. In FIGURE 5, at the right, the bolt 6 is hidden by the nuts on bolt 10. For the electrical connections to these bolts see the diagrammatic FIGURE 1 and also FIGURE 5.

Terminal 2 on the left is connected to bus bar 131 which is conected to cable 46. Terminal 10 on the right is connected to bus bar 132 which is connected to cable 46. FIGURE 4 is "moving" to the left, and it is on the left hand side of the locomotive. Terminal 10 on the left is connected to bus bar 133, and this is connected to cable 45. Terminal 2 on the right is connected by the bus bar 134 to cable 45. The bus bars 131 and 134 have the same shape, and the bus bars 132 and 133 have the same shape.

The wiring diagram is shown in FIGURE 7 and it will be seen that the ribbon ends extend a long distance (angularly many degrees) in the stators. Therefore they need to be bent and I propose hot forging for the ribbon ends and "Rokiding" afterwards. Copper has the advantage (for the ribbon windings 119) of lower ohmic resistance, but iron has the advantage of enormously greater magnetic permeance (reciprocal of magnetic reluctance) than copper, and the windings 119 are in both an electric circuit and a magnetic circuit.

For the material of the bus bars 131, 132, 133 and 134 I select beryllium bronze, 98 Cu 2 Be, to provide high tensile strength, high elastic limit, high electrical conductivity and reasonable susceptibility to cold working. See the Encyclopaedia Britannica, vol. 3, p. 541 left, article Beryllium, copyright 1963. The shapes of these bus bars are shown in FIGURES 4 and 5 but not completely, but I need only add that they should be streamlined, that is longer fore and aft than athwart. They can be elliptical in cross section with the major axes across the paper, FIGURE 4, say twice the minor axes. The upper parts of the brackets 113 and 114 are also desirably elliptical in cross section, major axis fore and aft. However, where the bus bars are fastened to the brackets, both parts are flat (or shaped to fit nicely) and heavily "Rokided" around the holes.

All "Rokide" coatings are porous so the exposed parts of the field piece poles, the edges of the ribbon windings, and the ribbon ends that connect pole to pole should be impregnated with some insulating organic material that will stand a temperature of 100° C. (boiling water). This can be done just after pouring the magnetic metal. "Val-Spar" is good, it can be put on with a brush, "Bakelite" varnish is good. See Encyclopaedia Britannica article on resins. The cables 45 and 46 if "Rokided" can be varnished too. The varnish can be sprayed as well as put on with a brush. The brackets 113 and 114 and the bus bars should be "Rokided" where they contact or are close and they should be varnished too.

Resuming the description of the assembly, the bus bars 131, 132, 133 and 134 are now connected. They are put over the bolts 2 and 10 outside the bracket 113 and the bolts extend through the bus bars and are threaded only outside the bus bars when the latter are in place, plus may be one turn to be sure to get a clamp. Using a screw driver in the slot to hold the bolt from rotating, a nut is put onto the screw and screwed in. On the inside of the bracket 113 the shoulder holds "Rokide" to "Rokide." This gives a high coefficient of friction. The nut is tightened very tight then an outer or lock nut is screwed into place. Of course each bus bar is held upright during these proceedings. Then the bus bars 131, 132, 133 and 134 are connected to the cables 45 and 46 in the electrical arrangement described and the mechanical means of doing so comes within the general electrical art and need not be described. Herein I have specified a "Rokide" coating wherever insulation is needed and insulating organic material on the "Rokide" wherever it is exposed to the weather, and if I have inadvertently failed to mention insulation for a contact or near approach, for parts needing insulation, the electrical engineer will know that I recommend "Rokide" and insulating organic material (resistant to boiling water) where the "Rokide" is exposed to the weather. After the assembly above described, all exposed parts of the bus bars 131–134 and brackets 113, 114 are "Rokided," then varnished, to keep people from being electrocuted. "Rokiding" apparatus is portable. The brackets act as bus bars also.

Turning now to the left hand bottom side of FIGURE 5 I show a bumper 161 having a dovetail fitting in the corresponding groove in the side piece 95. There is another bumper 162 on the other side, FIGURE 5. These are engageable with the rims of the wheels 51 and 52 respectively, and the rims consist of the treads and the flanges. The insides of the rims are flat as shown. This is in order that a great strain on the axle 77 or 78 due to centrifugal force generated by fast speed around a curve shall not break anything since the flat side of the rim will contact bumper 161 or 162. The wheel being made of steel, I propose the same beryllium bronze, 98 Cu 2 Be, for the material of these bumpers, as steel on bronze has a low coefficient of friction and this bronze is strong, tough and wear-resistant. It will be seen that the hubs 75 and 76 can contact the projecting portions of the side pieces 95, 96, 101 and 102 without the wheels contacting the bumpers, but a slight further movement permitted by the elasticity of the wheels and the axles will bring the wheels into contact with the bumpers. This provides a counterthrust far from the center of revolution which will prevent further motion. The bumpers 161 and 162 can be driven into place and held from lengthwise movement by removable bolts, not shown. By removing these bolts the bumpers can be hammered to move them out of place to be replaced by new ones when they show signs of wear.

So far as the locomotive is concerned, the wheels could be connected by rigid axles extending right across the locomotive. Thus a pair would have one axle. There is no reason for the engineer or the fireman to cross the axle at the rear of the locomotive, and at the front of the locomotive the engineer could be stationed in front of the axle and the fireman in the rear of the axle and, as a matter of fact, it will be easy enough to crawl under the axle even when the train is in motion, or to climb over it when the train is stopped.

When the locomotive engineer throws the switch 21 forward, the locomotive (or train) goes forward or to the rear. There are too many factors for me to figure this and it does not matter. The convention of switch to the rear, train forward is just as good as the convention switch forward train forward. This locomotive has just as much power and speed one way as the other; the difference is what the engineer can see.

The switch 21, 20, 30 is a current reversing switch and it engages the (electric) poles 31 and 32 or (electric) poles 171 and 172 and it will be seen from FIGURE 1 that the one connection is the reverse of the other one. Also the switch 21, 20, 30 is a circuit opening switch to allow the train to coast.

In driving from a station to high speed the main switch 21 should be opened whenever the speed is too great for the conditions. The rheostats RH should be in short circuit of the resistance coils. That is they are doing nothing. When at 180 miles per hour the engineer sees a truck stalled on the track three miles ahead, he has only one minute to stop the train, so he sets the electromagnetic brakes by moving the switch 21 to the opposite position in which the wheel motors are trying to reverse the train. This is a powerful brake—too powerful; it might cause the train to jump the track. This is where the rheostats come in. Before changing the switch 21 to reversing train position, the rheostats are put into full resistance position then gradually moved towards short circuit position until the negative acceleration is as high as need be for the conditions. Merely opening the switch 21 will cause sufficient slow down on account of wind resistance and friction for most purposes but for making a nice landing at a station the use of the electromagnetic brake plus the rheostats is recommended.

I have stated that molten magnetic metal is poured into the crevices between the pole pieces A–J and the casings 115 and 117. I have also said that the windings can be iron (steel) or copper, iron and steel being preferred, iron being the generic name. The melting point of iron, which is magnetic, is 1535° C., of cobalt, which is magnetic, is 1495° C., of nickel, which is magnetic, is 1455° C. Any of these or alloys can be used even with cooper ribbon, M.P. 1083° C. because "Rokide" that is aluminum oxide is a thermal insulator and the molten metal will freeze fast. Good examples of magnetic metal alloys for use here are manganese steel, 88 Fe 11 Mn 1 C, M.P. 1290° C., Hastelloy D, 90 Ni 3 Co 1.5 Al 5.5 Si, M.P. 1160° C., and any of the stellites, M.P. 1250–1275, see p. 1528 of the Handbook of Physics and Chemistry. The Chemical Rubber Co., Cleveland, Ohio. The stellites are cobalt based alloys. In this specification "pole pieces," "field pieces" and sometimes "poles" are synonymous.

The Pennsylvania Railroad is electrified all the way from Union Station, Washington, to Pennsylvania Station, New York City, and has been for a long time. Electricity is conveyed to the lomotives by an overhead live wire supported by steel posts alongside the tracks which support a network of wires that anybody can see are so designed that the live wire that is engaged by the pantograph trolley is at a fixed height above the tracks (the live wire does not sag) which permits high speeds and would permit the operation of trains at 200 miles an hour. There has to be a return line for the circuit of course, and that is the rails of the track.

If now a third rail were installed on the Pennsylvania Railroad from Washington to New York, three phase A.C., at desired voltage by means of transformers along the line, could be fed to the locomotives from the northeast electric power grid in which 3 phase 60 cycle (60 Hertz) current is synchronized in a vast network with hydroelectric and steam generators at widely separated places, such as New York State and West Virginia. The prime mover would then become a great number of hydraulic and/or steam turbines and the locomotives, on this line, would have neither diesels nor generators not electric converters.

But, it will be objected, it would be dangerous to put a third rail alongside the tracks of the Pennsylvania. The New York Central Railroad has a third rail electrified railroad from Grand Central Station in New York City, which crosses the Harlem River, runs along that river in the Bronx, a highly populated borough, then along the Hudson River north to Harmon, passing through more of the Bronx and through Westchester County. And the New York, New Haven and Hartford Railroad runs through the Bronx with a third rail. Much of Long Island, including densely populated Queens, is served by a third rail electric railroad, the Long Island. If New York State can permit this (and there is no public outcry against it), the states of New Jersey, Pennsylvania, Delaware and Maryland could permit it, too.

So therefore the prime mover P.M. (a diesel engine or an electric motor) is not indispensible in the locomotive and neither is the generator Gen. But most railroad trackage in the United States and Canada is not electrified, the locomotives on such tracks are diesel locomotives, and my locomotive can run on those tracks and needs a P.M. which will be a diesel engine at present, possibly a gas turbine in the future, it may someday be an atomic energy power plant, and in any of these cases there will be a generator Gen. in my locomotive.

Right now, in most cases, a diesel engine will be provided in the locomotive. As a preferred example, this can be the 1600 horsepower diesel made by General Motors, with 16 cylinders running at 800 r.p.m. See Marks, Handbook of Mechanical Engineering, seventh edition, Maple Press, New York, p. 1198, Table 4. But there are some advantages in following the European practice, in which there is a shift gear box (with clutch) between the diesel and the generator by the use of which the synchronous speed of the locomotive can be altered up or down.

The synchronous speed of my locomotive is figured as follows. The diameter of the wheels at the treads in the example given is 72 inches. This is 6 feet. Therefore the circumference of the wheels at the treads is 6 pi which is 18.84′. The r.p.s. of the rotating magnetific field is 60 (Hertz) times the number of pole pieces per phase. As there are nine pole pieces and the phases are 3, this number is 3. Sixty times 18.84 is 1130.4 which I take as 1130. The conversion from feet per second to miles per hour is 60/88. So we have 1130×3×60 divided by 88. Factoring we get 102.7×15 over 11=1540.5 miles per hour. This is much too fast, so I follow the European practice mentioned to make the synchronous speed 225 miles per hour. The locomotive will never reach this synchronous speed, but it will come close so that is why I call it a 200 m.p.h. locomotive.

In the best mode of the invention I have taught bolting copper, e.g. beryllium bronze, plates to the spokes of the wheels to pick up the rotating magnetic field and convert it to torque. But there are other ways of providing conductive metal between the spokes and the pole pieces, fastened to the spokes. A good way is to spray molten metal right onto the spokes. This can be done by the Schoop metal spraying process, the invention of Erika Morf (a woman) U.S. Patent 1,100,602, June 16, 1914. In this case I select commercially pure copper and the Morf patent tells the rest. The coating will not come off despite a difference in coefficient of expansion and a range of temperature, say −20° F. to 100° F. Coef. ex. of steel is 13, of copper 14, which means that the plates could be welded onto the spokes after all. This coating will probably stand the wider range of temperatures mentioned −40° C. to 100° C.

But instead of affixing metal plates to the spokes or depositing metal thereon by any method, there is another way to provide electro-conductive metal between the spokes and the pole pieces. This is by providing metal discs (copper or beryllium bronze preferred) and bolting them to the spokes, the discs fitting, more or less, the annular spaces between the hubs and the rims of the wheels. The discs should be laminated for efficiency. But I prefer the other embodiments herein described.

Wheildon's Patent 2,707,691 teaches that other stable metal oxides besides aluminum oxide (alumina) can be flame sprayed especially zirconia $ZrO_2$ and spinel. Many other examples of metal oxides that can be flame sprayed are given in column 5. All are thermal as well as electrical insulators and any of them can be used in Wheildon's "Rokide" process and can be used in this invention to make the pole pieces and will withstand the pouring of molten magnetic metal and the stable metal oxide will protect the iron or copper ribbon until the magnetic metal freezes.

So, following the Wheildon patent, I refer to the coating on the ribbon as a coating of stable metal oxide, or "coated with stable metal oxide." As for the ribbon other metals can be used and all metals are electro-conductive to some extent so I claim "metal ribbon." Also any magnetic metal is satisfactory for holding the pole pieces in place, and I have given several examples of the best ones known to me. And as any insulating organic material can be used for further insulating the pole pieces, and their windings, and I have given examples, I claim such for that purpose. The iron oxides, $FeO$, $Fe_2O_3$, $Fe_3O_4$, hematite, are not within the definition stable metal oxide nor is silica.

A wheel tread is a rim. The tread and the flange of a wheel taken together constitute a rim, so I claim a steel rim, or a rail fitting steel rim. "Steel" is a very wide term and I use it in that sense. I should not be limited to any group of ferrous metal but intend to include all.

It is sufficient to claim one unit of the locomotive because that covers any number, and all the wheels of the whole train, which is what I recommend. In my disclosure, every car is a locomotive so the claims cover the cars under the title "locomotive." On the Long Island Railroad and in the New York subways every car is a locomotive in this sense, and usually all are identical.

Also, I wish to point out that I am not limited to locomotive driving wheels having spokes. Many a vehicle wheel has been made with a disc connecting the hub and the rim of the wheel. The pole pieces create a rotating magnetic field and the magnetic circuit is from one pole of the pole piece, say N, on the side towards the wheel, through the conductive metal into the spokes or disc, then through the rim, through the outside steel cylinder 117, into the yoke 121 (magnetic), then to the opposite pole of the pole piece which instantaneously is S. That completes the magnetic circuit. As far as the magnetic circuit is concerned a disc is better than spokes, but mechanically spokes appear to be superior to a disc because American Locomotive Company and the Baldwin Locomotive Works built driving wheels with spokes almost exclusively at least for passenger trains. So therefore I claim steel connecting the hub and the rim of a wheel.

The circuit connection shown in FIGURE 7 is a delta connection and that is preferred (best mode). But a Y connection could be used. Also the circuit is a series circuit and that is preferred (best mode), but the poles could be connected in parallel. The rotating magnetic field is produced by a set of field pieces with generally parallel polar axes.

There is also another path for the flux (another magnetic circuit). It is from a pole piece or winding 119 through the electro-conductive metal into the spokes or disc, then through the hub of the wheel into the inside steel cylinder 115 and into the cylindrical part 113a of the bracket 113, to the yoke 121 and through it to the pole piece or winding again.

Instantaneously each field piece has a north and a south pole, one on one side, the other on the other side, the sides being the wheel and the yoke, and instantaneously each field piece is dead, but this requires no further explanation as it is the law of the induction motor invented by Nikola Tesla. In the case of metal plates or coatings on the spokes the electric circuit is hub through plates through rim through plates to hub.

I can say that there are electric connections to the field pieces from a polyphase source of A.C. without implying that there is a generator in the locomotive. This polyphase source has two or more phases, but I prefer three or more, and I prefer three. But two phase current can operate the locomotive, and with two phase current the electromagnetic brake (reversal of torque) can be applied and the locomotive can reverse (back up). I reject single phase as with it there can be no reversal of torque, no electromagnetic brake, no backing of the locomotive within the disclosure hereof. The switch 21, 20, 30, which can be open or connected to electric poles 31, 32 or 171, 172, is a current reversing switch in the electric connection to the field pieces from the polyphase source of A.C. whereby to apply an electromagnetic brake to the wheels (by reversing the torque on the wheels) or to reverse the locomotive (back up, go to the rear).

It will be seen that I have provided electric motors for locomotives in which the locomotive (includes car) driving wheels are the rotors of the motors, each motor having besides its rotor (armature) which is the driving wheel, a set of field pieces outside of the driving wheel and rigidly supported by the locomotive in that position. The bolts 2, 6 and 10 represent the axes of the field pieces to which they connect the polyphase A.C. and the same geometrical loci in the field pieces not having bolts are the axes thereof. It will be seen that these axes are parallel (but they don't have to be exactly so, so I say—generally parallel) and they are perpendicular to the plane of the driving wheel. The latter is any plane perpendicular to the axis of the driving wheel which plane is within the driving wheel. All wheels have axes.

The metal ribbon windings that make up the field pieces are wound mechanically spiral, by which I mean that, although the windings are not perfect geometrical spirals because they are not circular, they are wound in convolutions. That is each turn is wound upon the preceding turn. The field pieces are geometrically approximate sectors of an annulus held together by the magnetic casing 117 and also by the magnetic metal poured in situ. As there will be interstices in the field pieces after winding between the turns of the stable metal oxide coated metal ribbons at certain places, these interstices can be filled with the molten magnetic metal to reduce the reluctance of the magnetic circuit.

The windings 119, which form truncated sectors because they do not in this particular embodiment of the invention go to the center of the circle bounding their peripheries, form a hole which is a miniature truncated sector, the widest part of which (naturally) is the outer part of the hole. So the bolts 2, 6 and 10 need not be located midway between 115 and 117 but rather a little nearer 117. I know of no established geometrical nomenclature for windings into sectors so I coin the definition that the connections are in the sectoral centers of the windings.

The ribbons of the windings 119 are about three inches wide in this disclosure. The question is how thick should they be? It is desirable to have as many convolutions as possible and, on the other hand, to keep the ohmic resistance low. All in all a satisfactory thickness is one-eighth of an inch if the ribbon is made of iron, one-sixteenth of an inch if the ribbon is made of copper. The handbook cited gives the specific resistance of copper as 1.7 microhms-cm. and of iron as 10 microhms-cm., both at 20° C. (68° F.).

But the magnetic permeability of iron is thousands of times that of copper. If the ribbon is iron, it had best be better than 99% Fe. As air has tremendous reluctance, the advantages of pouring molten magnetic (highly permeable) metal into the interstices of the windings 119 will be readily seen. The only way that I know of to make the windings 119 is to wind the ribbons on a mandrel which is a minature edition of the truncated sectors A–F.

Many structural features of the locomotive and cars have been described herein resulting in a low slung locomotive and ditto cars, producing a low center of gravity and the construction described is light in weight which renders it possible for the train to go safely at 200 miles an hour, but these constructional features are claimed in Ser. No. 464,599.

It will thus be seen that there has been provided by this invention an electric locomotive in which the various objects hereinabove set forth together with many thoroughly practical advantages are successfully achieved. As many possible embodiments can be made of the invention and as many changes can be made in the embodiment described herein; it is to be understood that all matter hereinbefore set forth or shown in the accompanying drawings is to be interpreted as illustrative and not in a limiting sense.

I claim:

1. An electric locomotive having a driving wheel with a rail fitting steel rim, a steel hub, steel connecting the rim to the hub, a rotating magnetic field producing plurality of field windings with generally parallel axes outside of and adjacent to said driving wheel and positioned to direct the rotating magnetic field into the steel connecting the rim to the hub, electroconductive metal affixed to the steel between the steel and the field windings, so that the rotating magnetic field produces an electric current in the electroconductive metal thereby producing a torque in the wheel, a magnetic yoke to carry magnetic flux adjacent to the field windings on the side thereof opposite the steel, a magnetic casing surrounding the field windings so that the magnetic circuit is completed through the field windings to the steel connecting the rim to the hub, through the rim, through the magnetic casing to the magnetic yoke and through the yoke back to the field windings, and electric connections to the field windings from a polyphase source of A.C.

2. An electric locomotive according to claim 1 in which there is a current reversing switch in the electric connections to the field windings from the polyphase source of A.C. whereby to apply an electromagnetic brake and to reverse the locomotive.

3. An electric motor for a locomotive having a locomotive driving wheel which is the rotor of said motor, a set of field windings outside of the driving wheel the axes of the field windings being generally perpendicular to the plane of the driving wheel and generally parallel to each other, the field windings having mechanically spiral metal ribbon windings, said metal ribbon having a coating of stable metal oxide, a magnetic casing outside of and collectively holding the field windings, a magnetic yoke across the magnetic casing on the side of the field windings remote from the driving wheel and magnetic metal cast in situ securing the field windings in the magnetic casing filling interstices and reducing the magnetic reluctance of the magnetic circuit through the field windings, the wheel, the magnetic casing and the yoke.

4. An electric motor according to claim 3 in which the faces of the field windings adjacent to the wheel are insulated with insulating organic material.

5. An electric locomotive comprising a steel driving wheel having a hub, a rail fitting rim and steel spokes, non-magnetic metal on said spokes, said driving wheel being the rotor of an induction motor, said induction motor having a stator, means holding said stator adjacent to and outside of said driving wheel, said stator having windings oriented so that when energized by polyphase A.C. the windings generate a rotating magnetic field in the driving wheel rotor, the field passing through the metal on the spokes inducing electric current therein via the hub and the rim, the rotating magnetic field going into the steel spokes which are magnetic, and magnetic metal to complete the magnetic circuit back to the windings.

6. An electric locomotive according to claim 5 in which the windings are coated with stable metal oxide for insulation.

7. An electric locomotive according to claim 6 in which the interstices of the windings are impregnated with magnetic metal cast in situ to reduce reluctance.

8. An electric locomotive according to claim 5 in which the interstices of the windings are impregnated with magnetic metal cast in situ to reduce reluctance.

9. An electric locomotive comprising a driving wheel having a metal hub, a rail fitting metal rim and magnetic metal spokes connecting said hub and said rim, said driving wheel being the rotor of a polyphase induction motor, a stator for said induction motor suspended outside of said driving wheel and field windings in said stator which when energized with polyphase A.C. produce a rotating magnetic field in the spokes revolving around the hub and producing a torque to turn the wheel and drive the locomotive.

10. An electric locomotive having a driving wheel which is the rotor of a polyphase induction motor, a metal hub for said driving wheel, a rail fitting rim for said driving wheel, magnetic metal connecting the hub and the rim on the inside of the wheel, electroconductive metal connecting the hub and the rim on the outside of the wheel, a stator for the motor suspended outside of the driving wheel, and windings in the stator which when energized with polyphase A.C. produce a rotating magnetic field in said magnetic metal cutting said electroconductive metal producing electric current therein and a torque in the wheel to drive the locomotive.

11. An electric locomotive according to claim 10 in which the electroconductive metal connecting the hub and the rim consists of separate radial parts like spokes.

12. An electric locomotive according to claim 11 in which the magnetic metal connecting the hub and the rim consists of spokes.

13. An electric locomotive according to claim 10 in which the magnetic metal connecting the hub and the rim consists of spokes.

14. A winding for an electric motor comprising an elongated piece of metal wound to electro-magnetic field producing shape, said winding having interstices, said elongated piece of metal being coated with stable metal oxide as electrical and thermal insulation and being refractory, and magnetic metal in the interstices cast in situ therein the stable metal oxide protecting the winding from the magnetic metal.

References Cited

UNITED STATES PATENTS

| Number | Date | Name | Class |
|---|---|---|---|
| 142,605 | 9/1873 | Yates | 105—238 |
| 259,589 | 6/1882 | Rudd | 105—53 XR |
| 295,231 | 3/1884 | Cooke | 105—37 XR |
| 429,804 | 6/1890 | Baldwin | 105—26 |
| 495,849 | 4/1893 | Stuebner | 105—157 |
| 607,170 | 7/1898 | Halbert | 105—215 XR |
| 867,007 | 9/1907 | Boyes et al. | 105—53 XR |
| 961,293 | 6/1910 | Fowler | 105—133 XR |
| 1,035,018 | 8/1912 | Krause | 105—217 XR |
| 1,049,782 | 1/1913 | Valentine | 105—53 |
| 1,416,610 | 5/1922 | Cochran | 293—58 |
| 1,718,100 | 6/1929 | Ackerman | 105—26 |
| 1,915,770 | 6/1933 | Tessmer | 105—397 |
| 1,950,175 | 3/1934 | Hick | 105—364 |
| 1,974,018 | 9/1934 | Edmunds | 105—218 |
| 2,101,208 | 12/1937 | Willoughby | 105—364 |
| 2,469,808 | 5/1949 | Aske | 310—268 |
| 2,491,158 | 12/1949 | Brennan | 213—221 |
| 2,605,718 | 8/1952 | Omar et al. | 105—4 |
| 2,880,335 | 3/1959 | Dexter | 310—211 |
| 3,069,577 | 12/1962 | Lee | 310—166 |
| 3,171,051 | 2/1965 | Burr | 310—268 |
| 3,182,513 | 5/1965 | Mulhaupt | 105—215 XR |
| 3,230,406 | 1/1966 | Henry-Baudot | 310—268 XR |
| 3,304,450 | 2/1967 | Bosco et al. | 310—268 XR |

ARTHUR L. LA POINT, Primary Examiner

H. BELTRAN, Assistant Examiner

U.S. Cl. X.R.

105—56, 59; 310—114, 180, 208, 268